Oct. 8, 1929.  R. C. KELLEY  1,731,168
BIRD TRAP
Filed Sept. 24, 1928  2 Sheets-Sheet 1
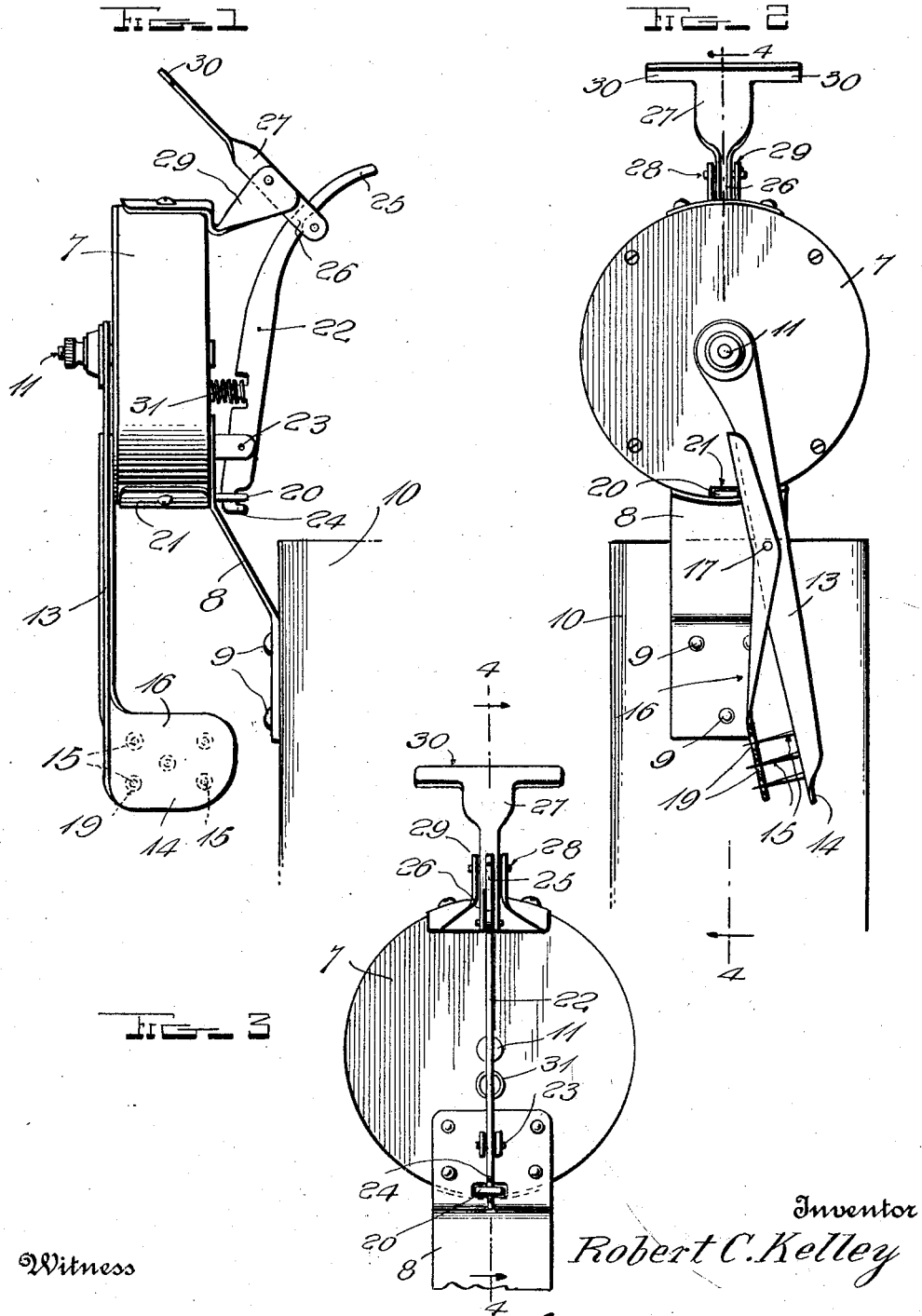

Oct. 8, 1929.  R. C. KELLEY  1,731,168
BIRD TRAP
Filed Sept. 24, 1928   2 Sheets-Sheet 2
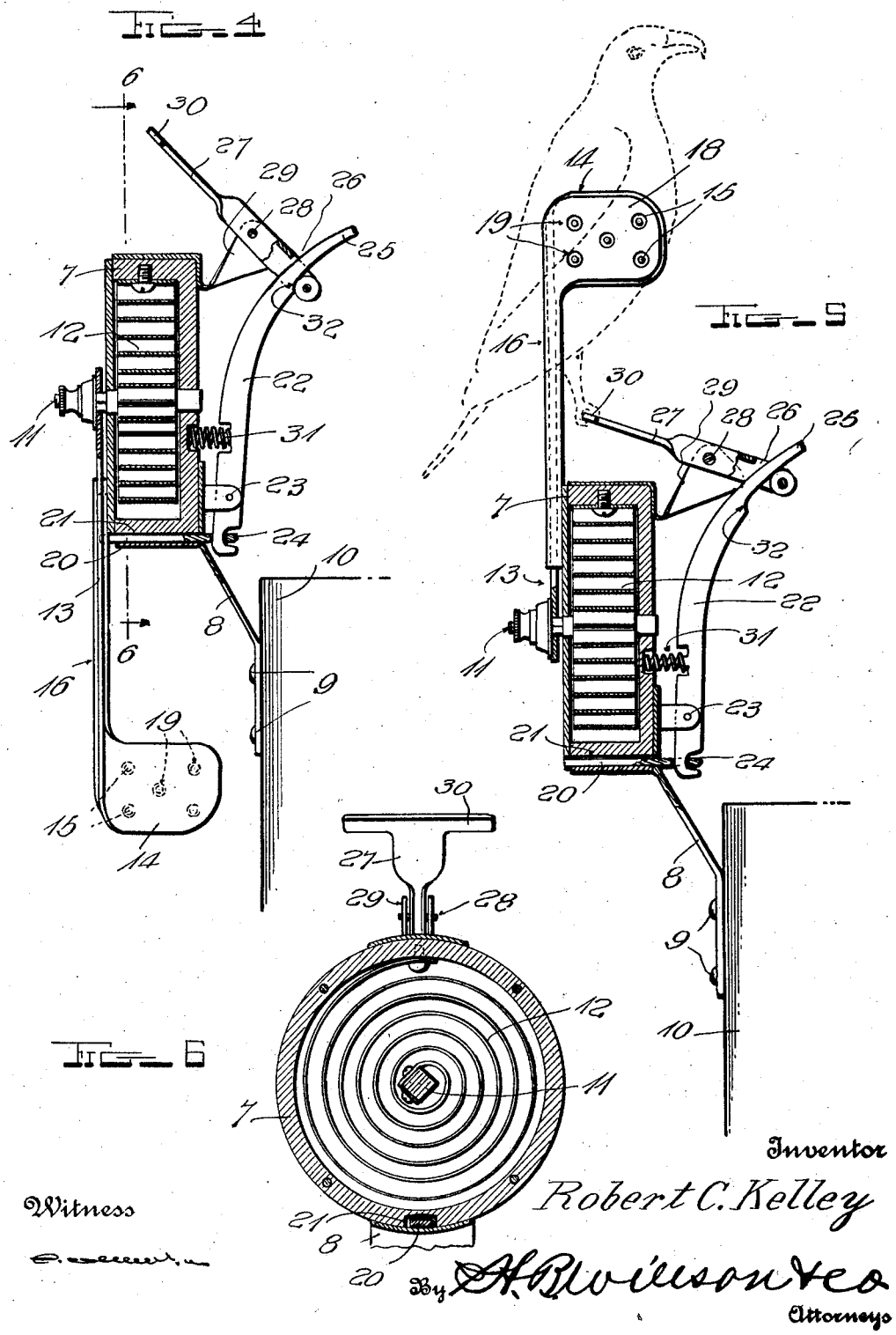
Inventor
Robert C. Kelley
By H. R. Wilson &co
Attorneys Patented Oct. 8, 1929

1,731,168

UNITED STATES PATENT OFFICE

ROBERT C. KELLEY, OF CHAUTAUQUA, KANSAS

BIRD TRAP

Application filed September 24, 1928. Serial No. 308,061.

The invention relates to improvements in traps of the general type in which a spring-actuated striking arm is released by the prey and when so released comes into play to strike the bird or animal which has effected the release of the arm, said arm being then arrested in condition to again function when released by another bird or animal.

It is one object of the invention to provide a new and improved construction and relation of parts well adapting the trap for use in killing crows and hawks.

Another object is to provide the striking arm with a prong upon which the prey is impalled, and to provide automatic means for forcing the prey from the prong to condition the latter for further operation.

Yet another aim is to provide a trap which, while being rather simple and inexpensive, will be highly efficient and reliable and will require no attention for long periods of time.

With the foregoing in view, the invention resides in the novel subject matter hereinafter described and claimed, description being accomplished by reference to the accompanying drawing.

Fig. 1 is a side elevation of a trap constructed in accordance with my invention, showing it set.

Fig. 2 is a side elevation looking in a direction at right angles to Fig. 1.

Fig. 3 is a side elevation looking in the reverse direction from Fig. 2.

Fig. 4 is a vertical sectional view substantially on the correspondingly numbered line of Figs. 2 and 3.

Fig. 5 is a view similar to Fig. 4 but illustrating the trap released and the striking arm coming into play.

Fig. 6 is a vertical sectional view on line 6—6 of Fig. 4.

The drawings above briefly described, illustrate the preferred form of construction, and while such construction will be herein specifically explained, it is to be understood that within the scope of the invention as claimed, variations may be made.

The numeral 7 denotes a cylindrical casing provided with an attaching bracket 8 to be secured by appropriate fasteners 9 to a post or other support 10. Extending centrally across the casing 7, is a shaft 11 which is rotatably mounted, and in said casing, is a spring 12 which is anchored at one end to said casing and at its other end to the shaft, exerting a constant force to rotate the latter in one direction. Secured to the shaft 11 and disposed at one side of the casing 7, is a striking arm 13 having a widened outer end 14 spaced outwardly from the side wall of said casing 7. This flat end 14 of the arm 13 is provided with a plurality of prongs 15 upon which to impale the prey. A cleaner 16 is provided to force the prey from the prongs 15, conditioning the latter for further use. This cleaner is preferably in the form of a lever fulcrumed between its ends at 17 to the arm 13, the outer end of said lever being of widened plate-like form as denoted at 18 and being formed with a plurality of openings 19 through which the prongs 15 pass. The inner end of the lever 16 is positioned to strike one end of a slide or stop 20 which is slidable in an appropriate guideway 21 in the lower portion of the casing 7, said slide extending from one side of said casing to the other. Lever 16 is disposed toward the direction in which the spring 12 tends to swing the arm 13. Hence, as long as this lever is in contact with the slide 20, the arm 13 cannot swing in said direction, the lever end 18 being then in a position near the outer ends of the prongs 15. Upon inward sliding of the stop or slide 20 however, the arm 13 is released and hence the spring 12 immediately comes into play to forcibly swing said arm. Incident to this swinging, the prongs 15 strike and impale the prey which has sprung the trap, thereby almost instantly killing him, and by the time the arm has made a complete revolution, projection of the slide or stop 20 has again been effected in a manner hereinafter described. Thus, the inner end of the lever 16 is forcibly struck by this slide or stop, with the result that it again moves to position of Fig. 2, thereby forcing the prey from the prongs 15 and at the same time, arresting the swinging of the arm 13, so that the trap is in condition for the next operation.

A substantially vertical lever 22 is fulcrumed near its lower end at 23 to the side of the casing 7 remote from the arm 13, the lower end of this lever being pivotally connected in any desired manner as at 24 with the slide or stop 20. The upper end 25 of lever 22, inclines away from the casing 7 and is slidably received in a guide 26 on the lower end of an inclined lever 27, said inclined lever being fulcrumed between its ends at 28 to a bracket 29 extending laterally from the upper portion of the casing 7. The upper end of lever 27 carries a perch 30 which is disposed over the casing 7, and when the trap is set, this perch occupies the position shown in Figs. 1, 2, 3 and 4, being maintained in that position under the influence of a coiled compression spring 31 which exerts an outward force on the upper portion of the lever 22. In thus forcing outwardly upon lever 22, the spring causes the inclined end 25 of said lever to slide through the guide 26 to the limit permitted by a stop 32 on the lever, thus swinging lever 27 to the position shown for instance in Figs. 1 and 4. Swinging of lever 22 under the influence of spring 31 also causes projection of the slide or stop 20 into the path of the lever 16 and arm 13, so that this spring holds the trap yieldably set, the prongs 15 being then disposed downwardly.

Whenever a sufficiently heavy bird lights upon the perch 30, he effects rocking of the lever 27 to the position shown in Fig. 5. This lever effects rocking of lever 22 and withdraws the slide or stop 20 as also seen in Fig. 5. Thus, the arm 13 is released and the spring 12 immediately functions to rapidly swing the arm, bringing the prongs 15 in contact with the bird and impaling him. As soon as he is knocked from the perch 30, the spring 31 restores all associated parts to normal position, thereby again projecting the stop or slide 20 into the path of the arm 13 and lever 16. Hence, as soon as the arm has made a complete revolution, the inner end of the lever 16 strikes the stop or slide 20, whereupon said lever is swung to the position of Fig. 2, with the result that it forces the prey from the prongs 15. It is of course understood that lever 16 is rather loosely fulcrumed to the arm 13 and that it readily swings about its fulcrum 17 to permit maximum penetration of the prey by means of the prongs 15.

Excellent results are obtainable from the details disclosed and they are therefore preferably followed, but within the scope of the invention as claimed, variations may be made as above stated. Preferably, spring 31 is of such strength that it will not be overcome by the smaller species of birds lighting upon the perch 30, but whenever a bird as heavy as a crow or a hawk lights upon said perch, the trap will be tripped and the bird killed.

I claim:—

1. A trap comprising a support, a striking arm pivotally mounted on said support and having a prey-impaling prong, means exerting a constant force to swing said arm about its pivot, self-applying trigger-released means for normally holding said arm against such movement and for arresting it when it has moved a revolution, and means for automatically forcing the prey from said prong to condition it for further use.

2. A trap comprising a support, a striking arm pivotally mounted on said support and having a prey-impaling prong, means exerting a constant force to swing said arm about its pivot, a self-projecting trigger-released stop carried by the body for normally holding the arm and for arresting it at the completion of one revolution after release of said arm, and a cleaner for said prong adapted to force the prey therefrom, said cleaner having an actuating portion to strike said stop and operate said cleaner when said arm is arrested.

3. A trap comprising a support, a striking arm pivotally mounted on said support and having a prey-impaling prong, means exerting a constant force to swing said arm about its pivot, a self-projecting trigger-released stop carried by the body for normally holding the arm and for arresting it at the completion of one revolution after release of said arm, and a lever extending longitudinally of said arm and fulcrumed between its ends thereto, one end of said lever being positioned to strike said stop when said arm is arrested, the other end of the lever being disposed at said prong and acting to force the prey therefrom when said lever is rocked by striking said stop.

4. A bird trap comprising a casing having an attaching bracket, a striking arm at one side of said casing having a carrying shaft which is rotatably supported by said casing, spring means in said casing exerting a constant force to rotate said shaft, a slide carried by the casing and extending from said one side thereof to its other side, one end of said slide normally abutting said arm to hold it against movement, releasing means for said slide embodying a depressible perch mounted over the casing, and spring means for yieldably supporting said perch and holding said slide projected.

5. A bird trap comprising a casing having an attaching bracket, a striking arm at one side of said casing having a carrying shaft which is rotatably supported by said casing, spring means in said casing exerting a constant force to rotate said shaft, a slide carried by the casing and extending from said one side thereof to its other side, one end of said slide normally abutting said arm to hold it against movement, a vertical lever fulcrumed between its ends at said other side of the casing and having its lower end connected to said slide, the upper end of said lever being inclined away from the casing, a perch over the casing, an inclined lever fulcrumed on the casing and supporting said perch, the lower end of said inclined lever being provided with a guide which slidably receives said inclined end of said vertical lever, and spring means for normally effecting projection of said slide and elevation of said perch.

In testimony whereof I have hereunto affixed my signature.

ROBERT C. KELLEY.